N. WASHBURN.
Casting Car-Wheels.
No. 125,917. Patented April 23, 1872.
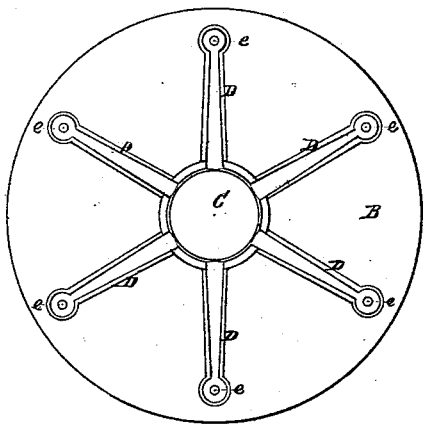
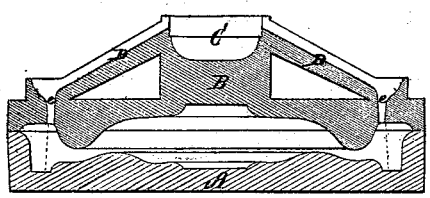
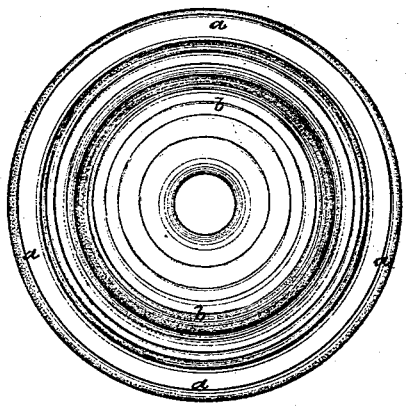
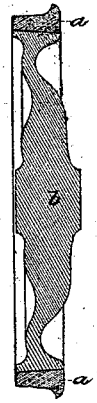
Witnesses.
S. N. Piper
L. N. Möller.
N. Washburn.
by his attorney.

125,917

UNITED STATES PATENT OFFICE.

NATHAN WASHBURN, OF WORCESTER, MASSACHUSETTS.

IMPROVEMENT IN CASTING CAR-WHEELS.

Specification forming part of Letters Patent No. 125,917, dated April 23, 1872.

*To all persons to whom these presents may come:*

Be it known that I, NATHAN WASHBURN, of the city and county of Worcester, of the State of Massachusetts, have made a new and useful invention having reference to the Founding of Cast-Metal Railway Car-Wheels with Steel Tires; and do hereby declare the same to be fully described in the following specification, reference being had to the accompanying drawing making part thereof, and of which—

Figure 1 is a top view, and Fig. 2 a transverse section of my new or improved mold for the casting of such a wheel.

In making car-wheels in accordance with the method described in the patent No. 97,329, dated November 30, 1869, and granted to Zadock Washburn, it has been discovered by me that when the metal is poured into the matrix of the mold at or near its center such metal in diverging therefrom to the heated tire laid in the mold often becomes so lowered in temperature on reaching the re-enforce or tire as not to properly weld to it. I have also discovered that by casting the iron first directly against the inner surface of the tire or re-enforce, and allowing the molten metal to flow therefrom in converging streams toward the center of the matrix, the welding of the re-enforce to the cast-metal body of the wheel is rendered surer and practically certain.

Before my invention it was the practice to cast the metal into the center of the mold, whereby the metal, after entering the matrix, diverged toward the tire. But, in carrying out my new process of making a cast-metal wheel with a steel re-enforce or tire welded to the cast-metal body, I introduce the metal into the mold simultaneously through a series of sprues, or the equivalent thereof, arranged around the mold and close to the re-enforce. I would observe that the tire or re-enforce, preparatory to being placed in the mold, is to be heated in a furnace or by other means to a red heat or a welding temperature; and while the tire is in such state and in the mold the metal to constitute the body of the wheel is to be cast directly against the tire so as to flow therefrom in streams convergent toward each other and the center of the mold or matrix.

The mold I employ for the manufacture of the car-wheel with the steel re-enforce or tire and a cast-iron body, the latter being founded against the re-enforce while the latter is at a red heat in the mold is shown in Figs. 1 and 2, the position of the re-enforce being exhibited in the latter figure by dotted lines.

Fig. 3 is a side view, and Fig. 4 a transverse section of the wheel after being founded or produced.

The re-enforce or steel tire is shown at *a*, and the cast-metal body at *b*, in the drawing.

The mold-bed A, in which the re-enforce or tire *a* is placed, is provided with a cap-portion, B, which is separable, and on its top is furnished with an elevated reservoir or cup, C, arranged at its center, and having a series of inclined spouts or conduits, D D, leading radially from it, and opening out of it at or near its top or upper edge. These conduits or channels lead into a series of sprues or holes or vertical conduits, *e e e*, opening into the matrix around it, and close to the inner circumference of the tire when placed on such matrix.

The molten metal is to be poured into the receiver C, from whence it will simultaneously be discharged through the several inclined conduits into the circular range of sprues, and directly against the inner periphery of the re-enforce or tire, thereby causing a much better or more certain union of the cast-metal body and the steel tire than when poured into the center of the matrix.

The mold is formed with a cavity to receive the re-enforce, and a matrix for casting against the inner periphery of the re-enforce the cast-metal body. Necessarily the re-enforce space and the body matrix form one cavity in the mold when it is without the re-enforce or tire.

I would remark that I make no claim to the invention of anything or process described in the said patent of Zadock Washburn, although at present I am the assignee thereof, or substantially enjoy the exclusive right to make wheels in accordance with such patent.

I am aware that for casting a car-wheel of two different qualities of iron a mold has been provided with two concentric cavities having separate passages leading from each through the upper part of the mold and into the matrix. My mold differs from such in having but one receiving cavity, with open channels or gutters leading from it into the several sprue-holes, the open channels enabling the molder to see that the flowage of the metal properly takes place to the several sprue-holes, and to readily remove any matter tending to interrupt such, which cannot be done with a channel or duct open only at its ends, as was employed in the mold for making a wheel of two qualities of iron.

I claim as my invention—

The mode or process described of making the cast-metal wheel with a steel tire or re-enforce, such consisting in introducing the metal into the mold simultaneously through a series of sprues arranged around the mold and close to the re-enforce, as described.

N. WASHBURN.

Witnesses:
 R. H. EDDY,
 J. R. SNOW.